United States Patent
Cox

(10) Patent No.: US 8,181,904 B1
(45) Date of Patent: May 22, 2012

(54) APPARATUS FOR FACILITATING TIRE VALVE STEM ACCESS IN SELF PROPELLED AIRCRAFT UNDERCARRIAGE

(75) Inventor: Isaiah Watas Cox, Baltimore, MD (US)

(73) Assignee: Borealis Technical Limited (GI)

( * ) Notice: Subject to any disclaimer, the term of this patent is extended or adjusted under 35 U.S.C. 154(b) by 420 days.

(21) Appl. No.: 12/387,865

(22) Filed: May 8, 2009

Related U.S. Application Data

(63) Continuation-in-part of application No. 12/291,257, filed on Nov. 6, 2008.

(60) Provisional application No. 61/127,202, filed on May 9, 2008, provisional application No. 61/002,079, filed on Nov. 6, 2007.

(51) Int. Cl.
*B64C 25/50* (2006.01)

(52) U.S. Cl. .......................................................... 244/50

(58) Field of Classification Search ............... 244/50, 244/100 R, 102 R, 103 R; 180/65.51, 904; 301/6.1, 6.2, 6.5
See application file for complete search history.

(56) References Cited

U.S. PATENT DOCUMENTS

| | | | | |
|---|---|---|---|---|
| 3,542,318 | A * | 11/1970 | Ellsworth | 244/103 S |
| 4,700,763 | A * | 10/1987 | Williams | 152/417 |
| 5,427,193 | A * | 6/1995 | Avakian | 180/65.51 |
| 6,450,448 | B1 * | 9/2002 | Suzuki | 244/104 FP |
| 2004/0200654 | A1 * | 10/2004 | Hatsuda et al. | 180/243 |
| 2005/0035676 | A1 * | 2/2005 | Rahman et al. | 310/83 |
| 2005/0056471 | A1 * | 3/2005 | Kurata | 180/65.5 |
| 2009/0114765 | A1 | 5/2009 | Cox et al. | |

FOREIGN PATENT DOCUMENTS
GB  2210833 A  *  6/1989

* cited by examiner

*Primary Examiner* — Joshua J Michener
*Assistant Examiner* — Nicholas McFall

(57) ABSTRACT

A self-propelled aircraft undercarriage is disclosed, comprising: an axle; a strut supporting said axle; at least one wheel rotatably mounted on said axle; a pneumatic tire mounted on said wheel; a valve stem connected to said tire for enabling measurement of the pressure of said tire; and drive means for driving said at least one wheel, mounted externally to said wheel; characterized in that the shape of said drive means accommodates said valve stem. Said undercarriage may be any aircraft undercarriage and specifically may be a nosewheel or main landing gear of an aircraft.

13 Claims, 2 Drawing Sheets

APPARATUS FOR FACILITATING TIRE VALVE STEM ACCESS IN SELF PROPELLED AIRCRAFT UNDERCARRIAGE

CROSS-REFERENCE TO RELATED APPLICATIONS

This Patent Application claims the benefit of U.S. Provisional Patent Application No. 61/127,202, filed May 9, 2008. This Application is also a Continuation-in-Part of U.S. patent application Ser. No. 12/291,257, filed Nov. 6, 2008, which application was published on May 7, 2009, as US-2009-0114765-A1, said application claims the benefit of Provisional Patent Application No. 61/002,079, filed Nov. 6, 2007. The above-mentioned documents are incorporated herein by reference in their entirety.

BACKGROUND OF THE INVENTION

The invention relates to aircraft ground movement and in particular to accommodating a valve stem for a pneumatic tire in an externally mounted motor on an aircraft landing gear.

U.S. Patent. Application Publication No. US 2009/0114765, published May 7, 2009, discloses a self-propelled aircraft undercarriage for driving an aircraft on the ground, comprising: an axle; a strut supporting said axle; at least one wheel rotatably mounted on said axle; and drive means for driving said at least one wheel; characterized in that said drive means is disk shaped and is external to said wheel. Said drive means is preferably a high phase order electric induction motor.

Electric motors having gaps in their construction are known in the art in a variety of shapes, well known in the art.

BRIEF SUMMARY OF THE INVENTION

For aircraft landing gear having pneumatic tires and externally mounted drive means, it would be advantageous to have easy access to a valve stem of said tire, to facilitate measuring tire pressure and inflating tires.

It would be further advantageous to be able to retrofit drive means to existing wheels without altering the location or operation of an existing valve stem.

It is an object of the present invention to provide a means of accessing a valve stem for an aircraft undercarriage tire having a drive means externally mounted thereon.

A self-propelled aircraft undercarriage is disclosed, comprising: an axle; a strut supporting said axle; at least one wheel rotatably mounted on said axle; a pneumatic tire mounted on said wheel; a valve stem connected to said tire for enabling measurement of the pressure of said tire; and drive means for driving said at least one wheel, mounted externally to said wheel; characterized in that the shape of said drive means accommodates said valve stem. Said undercarriage may be any aircraft undercarriage and specifically may be a nosewheel or main landing gear of an aircraft.

BRIEF DESCRIPTION OF THE SEVERAL VIEWS OF THE DRAWING

The invention will now be described in detail with reference to the following figures, in which.

DETAILED DESCRIPTION OF THE INVENTION

A self-propelled aircraft undercarriage is disclosed, comprising: an axle; a strut supporting said axle; at least one wheel rotatably mounted on said axle; a pneumatic tire mounted on said wheel; a valve stem connected to said tire for enabling measurement of the pressure of said tire; and drive means for driving said at least one wheel, mounted externally to said wheel; characterized in that the shape of said drive means accommodates said valve stem. Said undercarriage may be any aircraft undercarriage and specifically may be a nosewheel or main landing gear of an aircraft.

An advantage of the present invention is that easy access is enabled to a valve stem of said tire, to facilitate measuring tire pressure and inflating tires. A further advantage is the ability to retrofit drive means to existing wheels without altering the location or operation of an existing valve stem.

Figure 1:
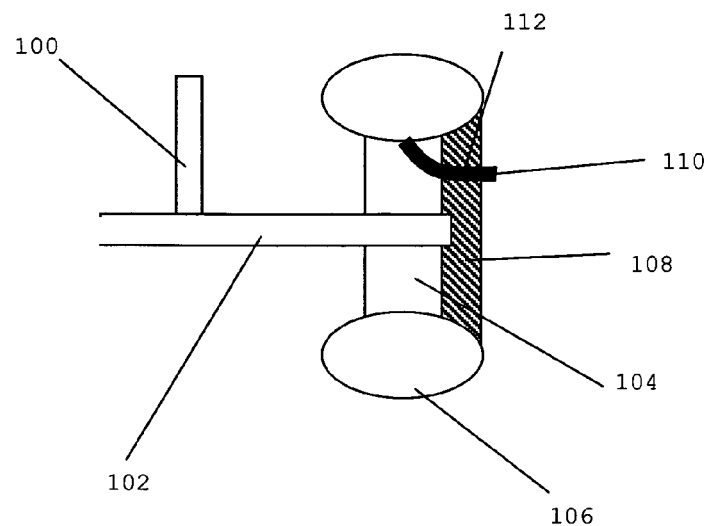
FIG. 1 shows the preferred arrangement of the invention wherein a valve stem protrudes through a wheel and a tire.

FIG. 1 shows the preferred arrangement of the undercarriage. In FIG. 1, axle 102 is rotatably mounted on strut 100. Wheel 104 is rotatably mounted on axle 102. Tire 106 is mounted on wheel 104. Drive means 108 is externally mounted on wheel 104. Preferably the drive means is mounted independently of axle 102. The shape of the drive means may include a cut-out in the center to allow mounting over the axle. Alternatively, the drive means may be mounted on axle 102.

Figure 2:
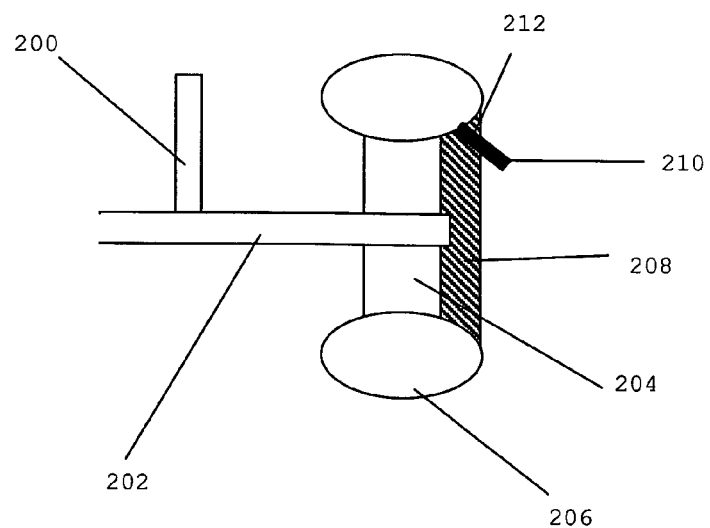
FIG. 2 shows an alternative arrangement wherein a valve stem protrudes through a tire only.

Valve stem 110 protrudes through wheel 104 via a hole in said wheel, and through drive means 108 via hole 112. In an alternative arrangement, shown in FIG. 2, valve stem 210 protrudes only through drive means 208. As a further alternative, the valve stem may protrude through a hole in any other component between the origin of the valve stem at the tire, and the point of access of the valve stem external to the drive means, for example a clutch or other decoupling mechanism. Valve stem 110 may be a standard valve stem or may be of extended length to reach the external side of said drive means and facilitate use at that location.

Said strut is a supporting strut as is known in the art of aircraft undercarriages. It may be retractable, telescopically or otherwise, and may be made of a metal, metal alloy or any other suitable material.

Said axle and said wheel are also as known in the art of aircraft undercarriages and may be of any suitable construction and material. Said wheel may be of any suitable construction and material. Said tire is a pneumatic tire as known in the art with a valve stem as known in the art.

Said drive means is preferably a high phase order electric induction motor. Said drive means may also be any other form of electric motor including but not limited to an electric synchronous or asynchronous AC induction motor, permanent magnet brushless DC motor, variable reluctance or switched reluctance motor. In either case, the electric motor can be designed as radial field or as axial field motor. Said drive means may also be a hydraulic motor or pneumatic motor.

The drive means is preferably toroidal but may also be a flat disc, curved disc, teardrop shaped, shaped to fit the cavity of said undercarriage, shaped to occupy the space created by the bulge of said tire, or any other shape. The cavity is the empty volume defined by the profile of the tire, wheel and other undercarriage components adjacent to the drive means. Preferably the drive means has a width smaller than its diameter.

Figure 3:
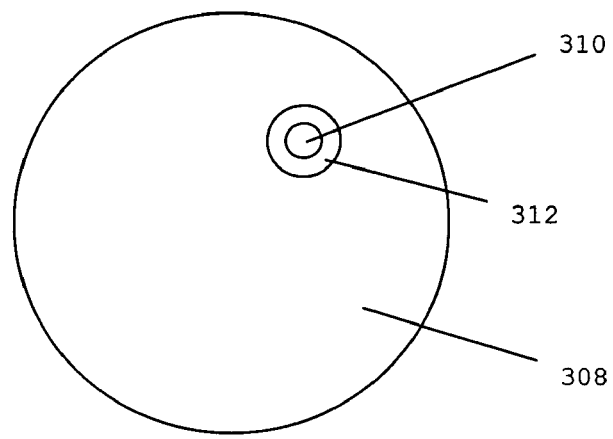
FIG. 3 shows a circular hole to allow access to the valve stem.
Figure 4:
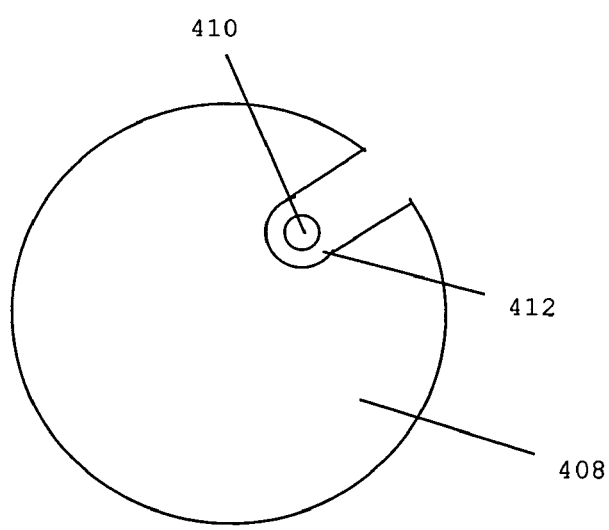
FIG. 4 shows a slit to allow access to the valve stem.

Preferably, as shown in FIG. 3, hole 312 is a circular hole within said drive means 308, located such that, when said drive means is installed on said undercarriage, said hole is aligned with valve stem 310. Preferably, hole 312 is slightly larger than the largest diameter of valve stem 310. An advantage of this arrangement is that the valve stem is made accessible with the least reduction in volume, and therefore power, of the drive means. A further advantage of this arrangement is that it facilitates removal of the drive means without the need to remove, for example, a cap of said valve stem. Removal of the drive means may be necessary, for example, to change a tire or for wheel maintenance or repair. Alternatively, as shown in FIG. 4, hole 412 in drive means 408 may be a slit from the point aligned with valve stem 410, radially outwards to the edge or diameter of said drive means. An advantage of this is that it may be easier to manipulate the valve stem when measuring pressure. A further advantage is that removal of the drive means may be easier.

The undercarriage may further comprise a mechanical coupling between said wheel and said drive means. An advantage of this is that the drive means can be decoupled from said wheel when not required to drive said wheel.

The undercarriage may further comprise a release mechanism whereby said drive means is easily removable from said axle, to facilitate tire removal, changing and maintenance.

Included in the scope of the invention is both a new undercarriage constructed with said drive means having said hole, and an existing undercarriage to which said drive means having said hole is fitted.

The invention claimed is:

1. An apparatus, for facilitating tire valve stem access in an aircraft with a self-propelled undercarriage, for moving said aircraft on the ground, said apparatus comprising:
   at least one wheel rotatably mounted on an axle to support a pneumatic tire;
   a valve stem connected to the tire for enabling measurement of tire pressure and inflation of said tire; and
   means for driving said at least one wheel to move said aircraft on the ground, wherein said means for driving is configured to be removably mounted independently of said axle and is configured to include means for receiving said valve stem and facilitating the measurement of tire pressure and inflation of said tire.

2. The apparatus of claim 1, wherein said means for driving is configured to have a shape selected from the list consisting of toroidal shapes, flat disc shapes, curved disc shapes, shapes to fit a cavity of said landing gear, and shapes to occupy a space created by the bulge of said tire.

3. The apparatus of claim 2, wherein said means for driving is configured to have a width smaller than its diameter.

4. The apparatus of claim 1, further comprising a decouplable mechanical coupling between said wheel and said means for driving.

5. The apparatus of claim 1 wherein said means for driving is a motor selected from the group consisting of electric synchronous or asynchronous AC induction motors, high phase order induction motors, permanent magnet brushless motors, and switched reluctance or variable reluctance electric motors.

6. The apparatus of claim 1, wherein said means for driving is a hydraulic motor or a pneumatic motor.

7. The apparatus of claim 1, further comprising a release mechanism whereby said means for driving is easily removable from said axle to facilitate tire removal, changing and maintenance.

8. The apparatus of claim 1, wherein said self-propelled undercarriage is an aircraft main landing gear or an aircraft nosewheel.

9. The apparatus of claim 1, wherein said means for receiving said valve stem configured in said means for driving comprises an opening formed in said means for driving with a diameter slightly larger than a largest diameter of said valve stem.

10. The apparatus of claim 1, wherein said means for receiving said valve stem configured in said means for driving comprises a slit formed in said means for driving shaped to align with said valve stem and extend radially outward to an outer edge of said means for driving.

11. The apparatus of claim 1, wherein said means for driving is further configured to be replaceably mounted and retrofitted in an aircraft undercarriage without altering the location or affecting the operation of an existing valve stem.

12. The apparatus of claim 9, wherein said self-propelled undercarriage comprises an aircraft nosewheel.

13. The apparatus of claim 12, wherein said means for driving comprises a high phase order electric induction motor.

* * * * *